(No Model.)
H. JEFFREY
DEVICE FOR PREPARING TUBES FOR WELDING.
No. 409,641. Patented Aug. 20, 1889.
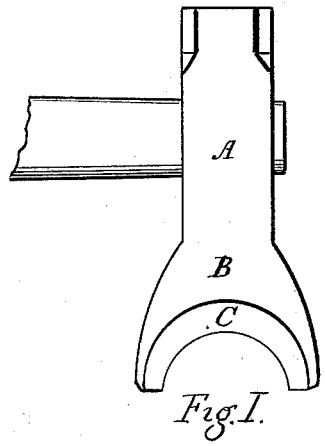
Fig. I.
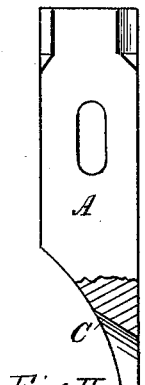
Fig. II.
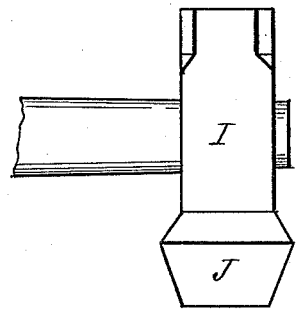
Fig. III.
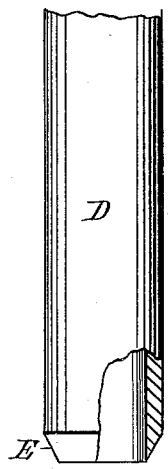
Fig. IV.
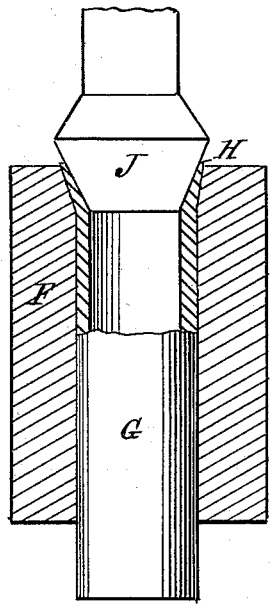
Fig. V.
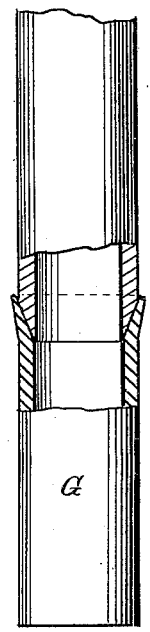
Fig. VI.
Witnesses:
Robert Kirk
Robt. S. Millar
Inventor:
Harry Jeffrey
By _____
Attorney.

UNITED STATES PATENT OFFICE.

HARRY JEFFREY, OF LUDLOW, KENTUCKY, ASSIGNOR OF ONE-HALF TO FRED HOEFFLE, OF MERIDIAN, MISSISSIPPI.

DEVICE FOR PREPARING TUBES FOR WELDING.

SPECIFICATION forming part of Letters Patent No. 409,641, dated August 20, 1889.

Application filed August 8, 1887. Serial No. 246,437. (No model.)

*To all whom it may concern:*

Be it known that I, HARRY JEFFREY, of Ludlow, in the county of Kenton and State of Kentucky, have invented a new and useful Improvement in Tools for Tube-Welding, which improvement is fully set forth in the following specification and accompanying drawings, in which—

Figure I is a front view of a scarfing-tool. Fig. II is a side view of the same, partly in section; Fig. III, a view of the expanding-tool; Fig. IV, a sectional view of the tube with the end scarfed out; Fig. V, the end of the tube to be united to the scarfed end of Fig. IV, showing its position in the expanding-tool and the application of the expander, Fig. III; and Fig. VI shows the adjacent ends of the tubes placed together preparatory to heating and welding.

The object of my invention is to provide means for rapidly preparing tubes for uniting by welding; and in order to accomplish this I prepare two tools, one of them being a bit having a crescent edge for scarfing off the end of one tube, and the other tool having an expanding head which is driven into the end of the other tube, the latter being placed in the tube having a bell-mouth, so that the tube may be expanded and have its ends slightly flaring to receive the scarfed end of the other tube.

Referring now to the accompanying drawings, A represents the first tool, having on its lower end a crescent-shaped extension B, flattened and ground with a tapering face C, so as to provide a cutting-edge around the circle. In using this tool I place a solid rod within the bore of the tube to be scarfed, and by means of this tool the end of the tube D is scarfed away, as shown at E. This may be done either with or without heating the end of the tube, although it is preferable to have the tube heated preparatory to scarfing the same.

F represents a tool tubular in shape, so as to receive the pipe G, which is of the same size as the pipe D. The upper end of this tube has a bell-mouth H, and the end of the tube G is heated and placed in the former-tube F, as shown in Fig. V. The tool I, Fig. III, has a tapering head J, the lower end of which is the same size as the interior of the tube G. The head J is forcibly driven down into the bore of the tube G, and the end of the latter is expanded, so as to form a bell-mouth.

The operation is as follows: It will be observed that in the process of preparing the opposite ends of the tubes one tube has its ends spread out or expanded by means of a swage, Fig. III, while the end of the other pipe is scarfed or cut away. These two are then united, as shown in Fig. VI, in which the scarfed end of the tube is placed within the expanded end of the other. In this connection they are placed in the furnace and heated to a welding temperature, after which a rod of the same diameter as the bore of the tube is placed in the tube past the welding-point, and a hammer is employed to batter down and weld the two points together.

I am aware that it is not new to expand one tube and compress the other, and I do not lay any claim to this feature; but it will be observed that the tools used in this operation are not designed to both expand and contract the opposite ends; but

What I claim particularly in this invention is—

In devices for preparing tubes for welding, the tool A, having the beveled and crescent shape C, jointly with the tool J, and the former-tool F, having the bell-mouth H, substantially as set forth.

In testimony that I claim the foregoing I have hereunto set my hand, this 17th day of June, 1887, in the presence of witnesses.

HARRY JEFFREY.

Witnesses:
ROBT. S. MILLER,
ROBERT RAMSEY.